(12) United States Patent
Kim (10) Patent No.: US 9,766,688 B2
(45) Date of Patent: Sep. 19, 2017

(54) ELECTRONIC DEVICE, CONTROL METHOD OF ELECTRONIC DEVICE, AND IMAGE FORMING APPARATUS

(71) Applicant: SAMSUNG ELECTRONICS CO., LTD., Suwon-si, Gyeonggi-do (KR)

(72) Inventor: Dang You Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 326 days.

(21) Appl. No.: 14/336,432

(22) Filed: Jul. 21, 2014

(65) Prior Publication Data

US 2015/0067374 A1 Mar. 5, 2015

(30) Foreign Application Priority Data

Sep. 4, 2013 (KR) .................. 10-2013-0105809

(51) Int. Cl.
*G06F 13/38* (2006.01)
*G06F 1/32* (2006.01)
*G06F 13/40* (2006.01)

(52) U.S. Cl.
CPC .......... *G06F 1/3284* (2013.01); *G06F 13/385* (2013.01); *G06F 13/4072* (2013.01); *Y02B 60/1228* (2013.01); *Y02B 60/1235* (2013.01)

(58) Field of Classification Search
CPC .. G06F 13/385; G06F 13/4072; G06F 1/3284; Y02B 60/1228; Y02B 60/1235
See application file for complete search history.

(56) References Cited

U.S. PATENT DOCUMENTS

| | | | |
|---|---|---|---|
| 6,928,562 B2* | 8/2005 | Cohen | G06F 13/4081 710/313 |
| 7,320,077 B2* | 1/2008 | Kim | G06F 1/26 713/300 |
| 8,352,644 B2* | 1/2013 | Malamant | G06F 1/3203 710/16 |
| 2002/0062416 A1 | 5/2002 | Kim et al. | |
| 2002/0138776 A1* | 9/2002 | Cohen | G06F 13/4081 713/320 |
| 2007/0255885 A1* | 11/2007 | Bohm | G06F 13/4022 710/316 |
| 2011/0191616 A1* | 8/2011 | Cheng | G06F 1/32 713/323 |

(Continued)

OTHER PUBLICATIONS

Extended European Search Report dated Feb. 18, 2015 in corresponding European Patent Application No. 14180313.0.

(Continued)

*Primary Examiner* — M Elamin
(74) *Attorney, Agent, or Firm* — Staas & Halsey LLP (57) ABSTRACT

An electronic device, a control method of the electronic device, and an image forming apparatus to cut off unnecessary power after recognizing connection/disconnection statuses of Universal Serial Bus (USB) hosts/devices connected to a USB hub are provided. The electronic device includes a USB hub connected to a USB host/device, a first switch configured to switch power supply to the USB hub for reducing power consumption, a controller configured to turn the first switch off to cut off power supply to the USB hub when no USB host/device is connected to the USB hub or only a USB host/device not requiring constant power supply is connected to the USB hub.

31 Claims, 11 Drawing Sheets

(56) References Cited

U.S. PATENT DOCUMENTS

| | | | |
|---|---|---|---|
| 2011/0202692 A1* | 8/2011 | Chang | G06F 1/1632 |
| | | | 710/16 |
| 2012/0079308 A1 | 3/2012 | Sasaki | |
| 2013/0013936 A1* | 1/2013 | Lin | G06F 1/266 |
| | | | 713/300 |
| 2013/0031394 A1 | 1/2013 | Hayashi | |
| 2013/0054866 A1* | 2/2013 | Saito | G06F 1/266 |
| | | | 710/313 |
| 2013/0073777 A1* | 3/2013 | Monks | G06F 13/4291 |
| | | | 710/316 |
| 2014/0101345 A1* | 4/2014 | Ranta | G06F 13/4081 |
| | | | 710/16 |

OTHER PUBLICATIONS

European Decision on Grant dated May 15, 2017 in corresponding European Patent Application No. 14 180 313.0.

\* cited by examiner

ELECTRONIC DEVICE, CONTROL METHOD OF ELECTRONIC DEVICE, AND IMAGE FORMING APPARATUS

CROSS-REFERENCE TO RELATED APPLICATIONS

This application is related to, and claims the priority benefit of, Korean Patent Application No. 10-2013-0105809, filed on Sep. 4, 2013 in the Korean Intellectual Property Office, the disclosure of incorporated herein by reference.

BACKGROUND

1. Field

Embodiments relate to an electronic device that communicates with an external device through a Universal Serial Bus (USB).

2. Description of the Related Art

In general, a USB is an industrial standard data bus for transmitting digital data between a USB hub and a USB host/device. A USB host/device supports communication through a USB. The USB host or the USB hub can supply power to the USB host/device. Some USB hosts/devices can be operated on a USB bus or separately from the USB bus.

In operation of such a USB host or USB hub, power may be unnecessarily consumed as power may be continuously supplied to the USB hub, the USB host, and/or the USB host/device despite the fact that the USB host or the USB host/device is not connected to the USB hub. Power also may be unnecessarily consumed as the USB host or the USB host/device may be connected to the USB hub, but only a USB host or USB host/device that does not need to be turned on in a power saving mode is connected.

SUMMARY

Additional aspects and/or advantages will be set forth in part in the description which follows and, in part, will be apparent from the description, or may be learned by practice of the invention.

An aspect of an embodiment is to prevent unnecessary power supply by recognizing a status of a connection/disconnection of USB hosts/devices with to a USB hub.

In accordance with an aspect of an embodiment, an electronic device includes a USB hub to which a USB host/device is connected, a first switch configured to switch power supply to the USB hub, and a controller configured to turn off the first switch to cut off power supply to the USB hub in a sleep mode for reducing power consumption when no USB host/device is connected to the USB hub or only a USB host/device not requiring constant power supply is connected to the USB hub.

In a electronic device, the USB host/device connected to the USB hub may be supplied power from the USB hub.

In a electronic device, a port provided on the USB hub may include at least one of a USB port and an EDI port.

In a electronic device, the USB host/device requiring constant power supply may include a wireless network apparatus.

In accordance with an aspect of an embodiment, an electronic device includes a USB hub to which a USB host/device is connected, a first switch configured to switch power supply to the USB hub, a second switch and a third switch configured to directly supply power to the USB host/device without going through the USB hub, and a controller configured to selectively turn off the first switch, the second switch, and the third switch to cut off power supply to the USB hub or the USB host/device connected to the USB hub in a sleep mode for reducing power consumption when no USB host/device is connected to the USB hub, or only USB host/device not requiring constant power supply is connected to the USB hub.

In a electronic device, the second switch may be provided to switch power supply of a first USB host/device requiring constant power supply in the sleep mode to reduce power consumption, the third switch may be provided to switch power supply of a second USB host/device not requiring constant power supply in the sleep mode.

In a electronic device, the USB host/device requiring constant power supply may include a wireless network apparatus.

In a electronic device, a port provided on the USB hub may include at least one of a USB port and an EDI port.

In accordance with an aspect, a control method of an electronic device, which has a USB hub to which a USB host/device is connected, a first switch configured to switch power supply to the USB hub, and a controller configured to turn the first switch on/off, includes: determining whether a sleep mode for reducing power consumption is in progress; and when the sleep mode is in progress, turning the first switch off to cut off power supply to the USB hub when no USB host/device is connected to the USB hub, or only a USB host/device not requiring constant power supply is connected to the USB hub.

In a control method of an electronic device, when the electronic device is not in the sleep mode, the first switch may be turned on and power may be supplied to the USB host/device through the USB hub.

In a control method of an electronic device, the USB host/device requiring constant power supply may include a wireless network apparatus.

In accordance with an aspect of an embodiment, a control method of an electronic device, which has a USB hub connected to a first USB host/device, a second USB host device, and a third USB host/device, a first switch configured to switch power supply to the USB hub, a second switch configured to switch power supply to the first USB host/device, a third switch configured to switch power supply to the second USB host/device, a controller configured to turn each of the first switch and the second switch, the third switch on/off to control power supply to the USB hub, the first USB host/device, and the second USB host/device, includes: determining whether a sleep mode for reducing power consumption is in progress; and in the sleep mode for reducing power consumption, when no USB host/device is connected to the USB hub or only a USB host/device not requiring constant power supply is connected, selectively turning the first switch, the second switch, the third switch off to cut off power supply to the USB hub or the USB host/device connected to the USB hub.

In a control method of an electronic device, the second switch may be provided to switch power supply to a first USB host/device requiring constant power supply in the sleep mode for reducing power consumption and the third switch may be provided to switch power supply to a second USB host/device not requiring constant power supply in the sleep mode.

In a control method of an electronic device, the first USB host/device requiring constant power supply may include a wireless network apparatus.

In a control method of an electronic device, a port provided on the USB hub may include at least one of a USB port and an EDI port.

In accordance with an aspect of an embodiment, a control method of an electronic device, which has a USB hub connected to a USB host/device, a first switch configured to switch power supply to the USB hub, a controller configured to turn the first switch on/off to control power supply to the USB hub, a pull-down resistor connected in parallel on a path electrically connecting between an input port of the controller and the port of USB hub, includes: receiving logic signals at a high/low level on the electrical path by the pull-down resistor depending on a connection state of the USB host/device; and recognizing connection of the USB host/device through the received logical signals.

In the control method of the electronic device, when the USB host/device is recognized as being connected to the USB hub and a sleep mode for reducing power consumption is in progress, if no USB host/device is connected to the USB hub or only a USB host/device not requiring constant power supply is connected to the USB hub, the first switch may be turned off and power supply to the USB hub may be cut off.

In accordance with an aspect of an embodiment, an image forming apparatus includes a USB hub to which a USB host/device is connected; a first switch configured to switch power supply to the USB hub, and a controller configured to turn the first switch off to cut off power supply to the USB hub in a sleep mode for reducing power consumption when no USB host/device is connected to the USB hub or only a USB host/device not requiring constant power supply is connected to the USB hub.

In the image forming apparatus, power may be supplied to the USB host/device connected to the USB hub from the USB hub.

In the image forming apparatus, a port provided on the USB hub may include at least an of a USB port and an EDI port.

In the image forming apparatus, the USB host/device requiring constant power supply may include a wireless network apparatus.

In accordance with an aspect of an embodiment, an image forming apparatus includes a USB hub to which a USB host/device is connected, a first switch configured to switch power supply to the USB hub, a second switch and a third switch configured to directly supply power to the USB host/device without going through the USB hub; and a controller configured to selectively turn the first switch, the second switch and the third switch off to cut off power supply to the USB hub, or the USB host/device connected to the USB hub in a sleep mode to reduce power consumption if no USB host/device is connected to the USB hub, or if only a USB host/device not requiring constant power supply is connected to the USB hub.

In the image forming apparatus, the second switch may be provided to switch power supply to a first USB host/device requiring constant power supply in a sleep mode for reducing power consumption and the third switch may be provided to switch power supply to a second USB host/device not requiring constant power supply in the sleep mode.

In the image forming apparatus, the USB host/device requiring constant power supply may include a wireless network apparatus.

In the image forming apparatus, a port provided on the USB hub may include at least an of a USB port and an EDI port.

An exemplary embodiment can cut off unnecessary power supply by recognizing connection/disconnection statuses for the USB apparatuses connected to the USB hub, and reduce consumption power caused by connection of the USB host/device.

BRIEF DESCRIPTION OF THE DRAWINGS

These and/or other aspects of the invention will become apparent and more readily appreciated from the following description of the embodiments, taken in conjunction with the accompanying drawings of which:

FIG. 5 is an equivalent circuit diagram when a first switch of FIG. 3 is turned on;

DETAILED DESCRIPTION

Reference will now be made in detail to the embodiments, examples of which are illustrated in the accompanying drawings, wherein like reference numerals refer to like elements throughout.

Figure 1:
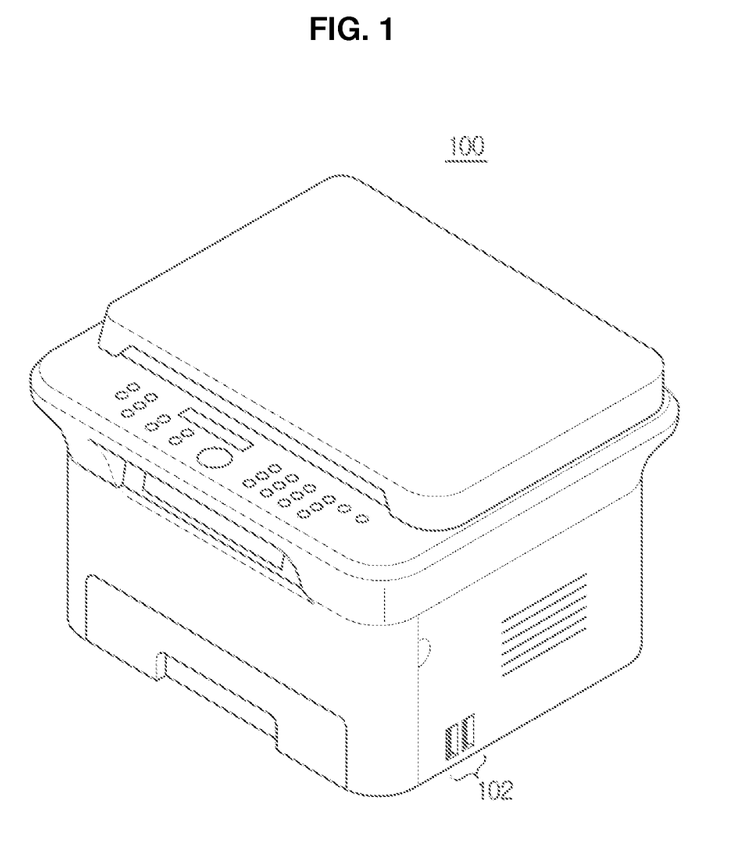
FIG. 1 is a view illustrating an image forming apparatus in accordance with an embodiment.

FIG. 1 is a view illustrating an image forming apparatus in accordance with an embodiment. The image forming apparatus 100 illustrated in FIG. 1 is an example of an electronic device in communication with an external device through a USB, and exemplifies control of USB power according to an embodiment. As illustrated in FIG. 1, the image forming apparatus 100, which is a type of electronic device, includes a plurality of USB ports 102, for example, on its side. The location of the USB ports is not limited to the side, but may be any of various places like as the top, front, rear, etc. The number of the USB ports 102 is not limited.

Figure 2:
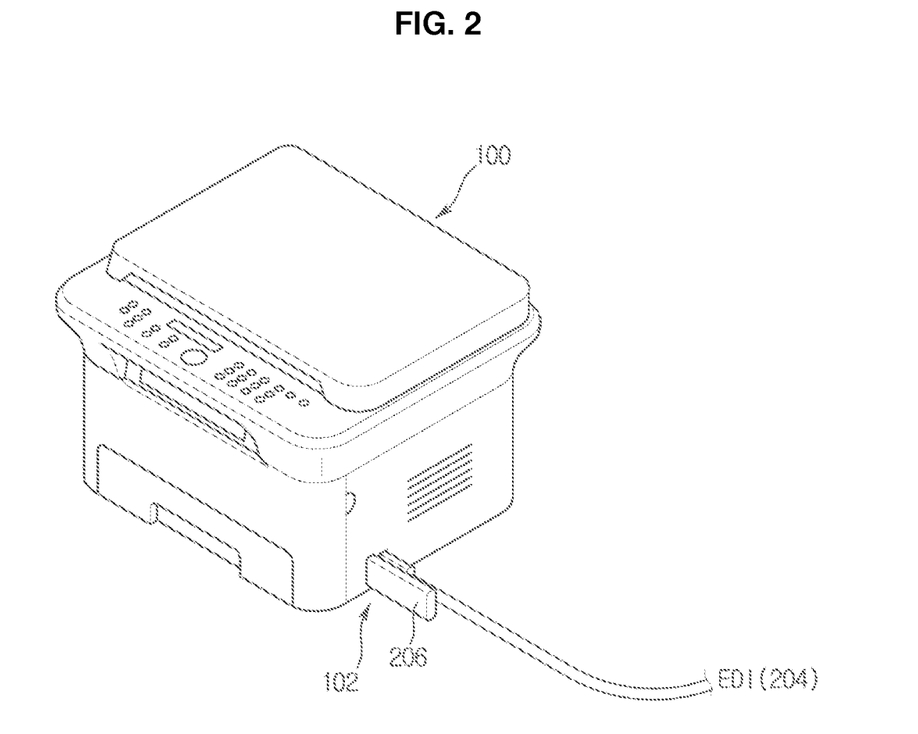
FIG. 2 is a view illustrating a status of USB ports of an image forming apparatus connected to various types of USB hosts/devices in accordance with an embodiment.
Figure 3:
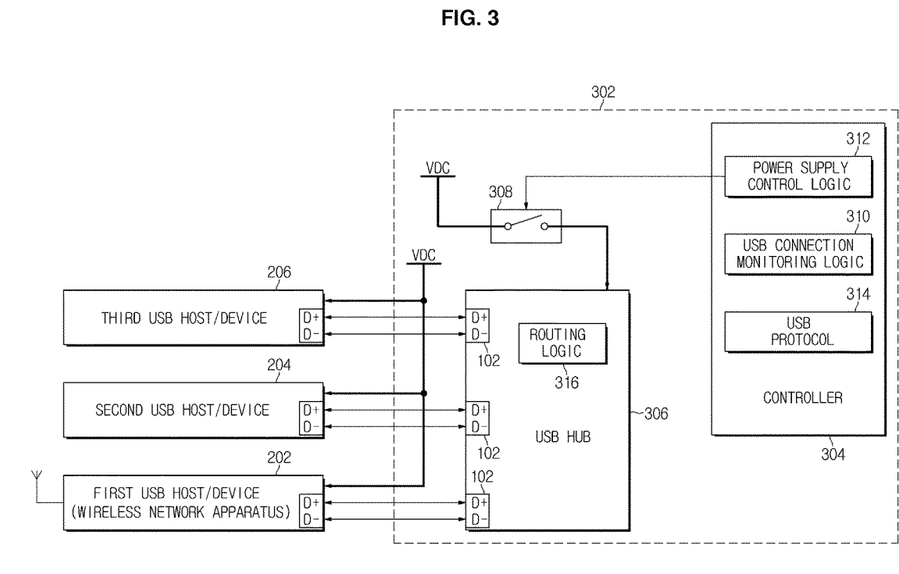
FIG. 3 is a view illustrating a connection relation for USB data communication between an image forming apparatus and USB hosts/devices in accordance with an exemplary embodiment.

FIG. 2 is a view illustrating a status of USB ports of an image forming apparatus connected to various types of USB hosts/devices in accordance with an embodiment. As illustrated in FIG. 2, the USB port 102 of the image forming apparatus 100 exposed to the outside may be connected to a USB memory 206 or an electronic data interchange (EDI)

system 204. As illustrated in FIG. 3, a USB host/device 202 may be connected directly to a USB hub 306 installed on a main board 302 in the image forming apparatus 100. For example, a wireless network apparatus such as a WI-FI apparatus may be connected directly to the USB hub 306 and installed inside the image forming apparatus 100, and not exposed to the outside. USB data communication may be performed between the image forming apparatus 100 and the USB hosts/devices 202, 204, and 206 through the connection. All of the USB memory 206, the EDI system 204, the wireless network apparatus 202, etc. are USB hosts/devices. The term "USB host/device" includes all USB hosts and USB devices. The wireless network apparatus 202 connects other devices capable of wireless networking to the image forming apparatus 100 through wireless communication, and may thus perform a target print job. A constant power supply to the wireless network apparatus 202 may be maintained regardless of an operation mode so that requests or data transmission of other devices can be confirmed. As the USB memory 206 is a data storage apparatus, the image forming apparatus 100 may directly read and perform a print job from data stored in the USB memory 206 without executing any related applications. The EDI system 204 is an electric documentation exchange system in which information is transferred between computers according to agreed communication standards of standardized commercial format or public format. Thus, the USB hosts/devices may be divided into devices for which constant power supply is maintained, such as the wireless network apparatus 202, and devices for which power is temporarily supplied or cut off according to necessity, such as the USB memory 206 and the EDI system 205 according to the operating characteristics.

FIG. 3 is a view illustrating a connection relation for USB data communication between the image forming apparatus and the USB hosts/devices in accordance with an exemplary embodiment. As illustrated in FIG. 3, a main board 302 of the image forming apparatus 100 in accordance with an exemplary embodiment includes a controller 304, a USB hub 306 and a first switch 308.

The controller 304 controls operations, e.g., all operations of the image forming apparatus 100. The controller 304 cuts off unnecessary power supply after recognizing connection/disconnection statuses of the USB hub 306 and the USB hosts/devices 202, 204, and 206 connected to the USB hub 306. The controller 304 includes a USB connection monitoring logic 310, a power supply control logic 312, and a USB protocol 314. The USB connection monitoring logic 310 of the controller 304 monitors connection statuses of the USB hosts/devices 202, 204, and 206 connected to the USB hub 306, and recognizes types of the USB hosts/devices 202, 204, and 206. The power supply control logic 312 of the controller 304 generates control signals to control on/off of the first switch 308 provided on the power transmission path of the USB hub 306. That is, the power supply control logic 312 supplies power to the USB hub 306, or cuts off power supply to the USB hub 306 based on connection statuses and recognition information of the USB hosts/devices 202, 204, and 206. The power supply control logic 312 generates control signals to control on/off of the first switch 308. The USB protocol of the controller 304 may be used for storing and managing USB communication specifications.

The USB hub 306 includes a routing logic 316. The routing logic 316 of the USB hub 306 is involved in assigning communication paths of the USB hosts/devices 202, 204, and 206 connected to the USB hub 306. The USB port 102, see, for example, FIGS. 1 and 2, may be provided in the USB hub 306. Each of the USB hosts/devices 202, 204, and 206 may also include a USB port, or be connected to a USB cable.

The first switch 308 may be used for supplying or cutting off power to the USB hub 306 from a power source VDC, and may be turned on/off by control signals generated by the power supply control logic 312 of the controller 304. If the first switch 308 is turned on, power is supplied to the USB hub 306, and if the first switch 308 is turned off, power to the USB hub 306 is cut off. Independently of the power supply path to the USB hub 306, power may be supplied to the USB hosts/devices 202, 204, and 206 connected to the USB hub 306. For reference, the plurality of USB hosts/devices 202, 204, and 206 connected to the USB hub 306 of the image forming apparatus 100 may function as USB hosts by themselves.

Figure 4:
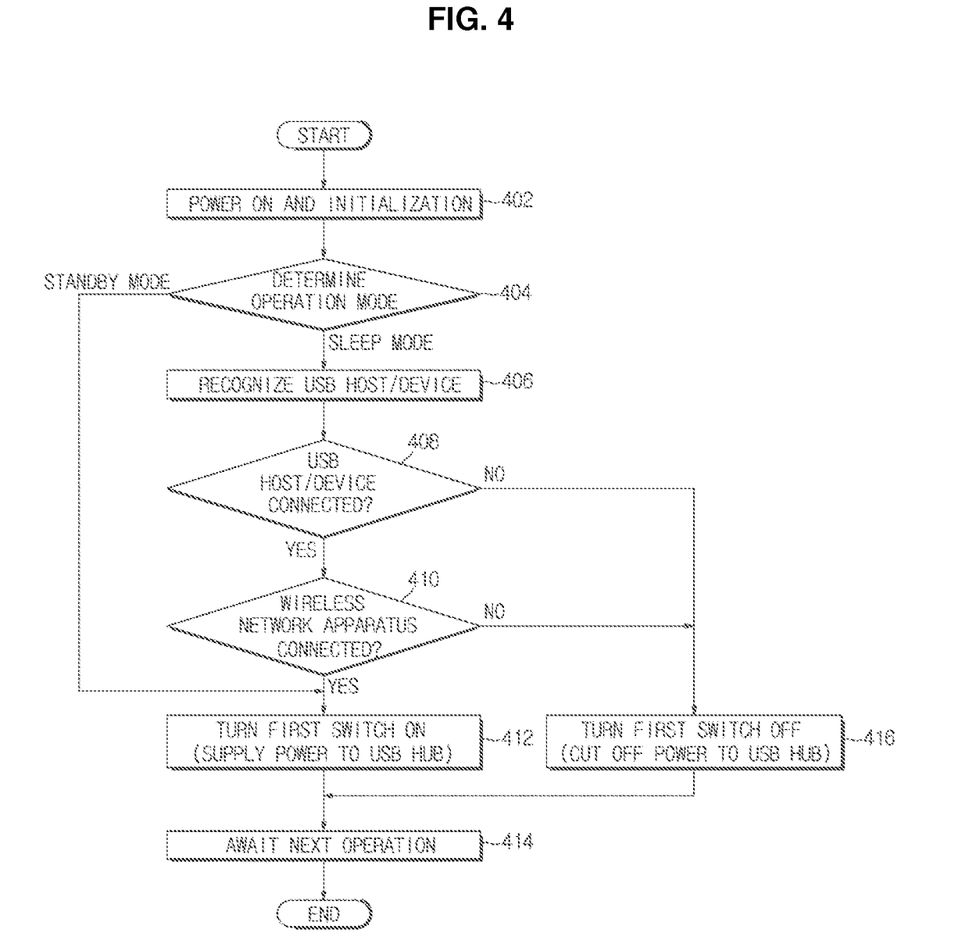
FIG. 4 is a view illustrating a USB control method of an image forming apparatus in accordance with an exemplary embodiment.
Figure 5:
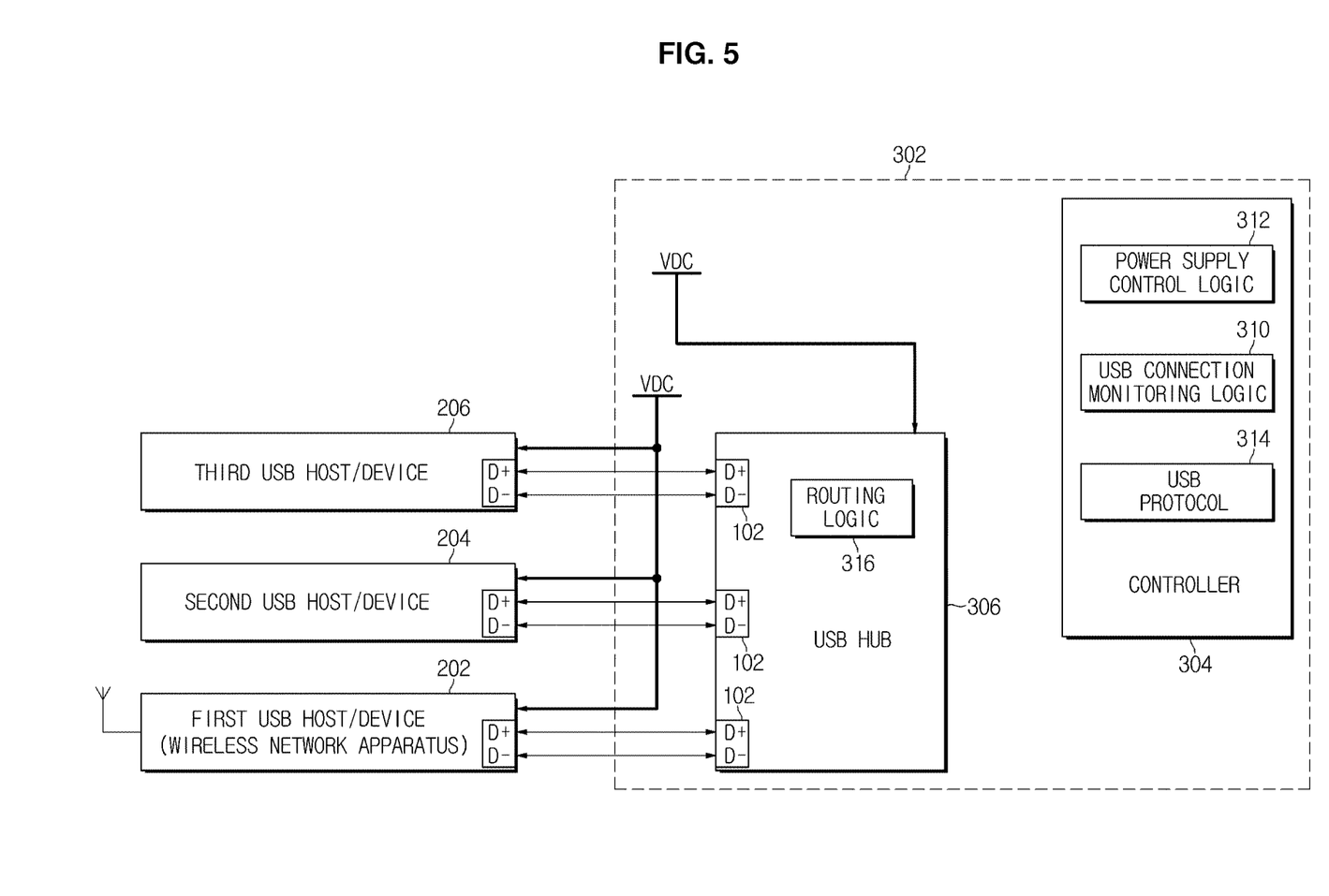
Figure 6:
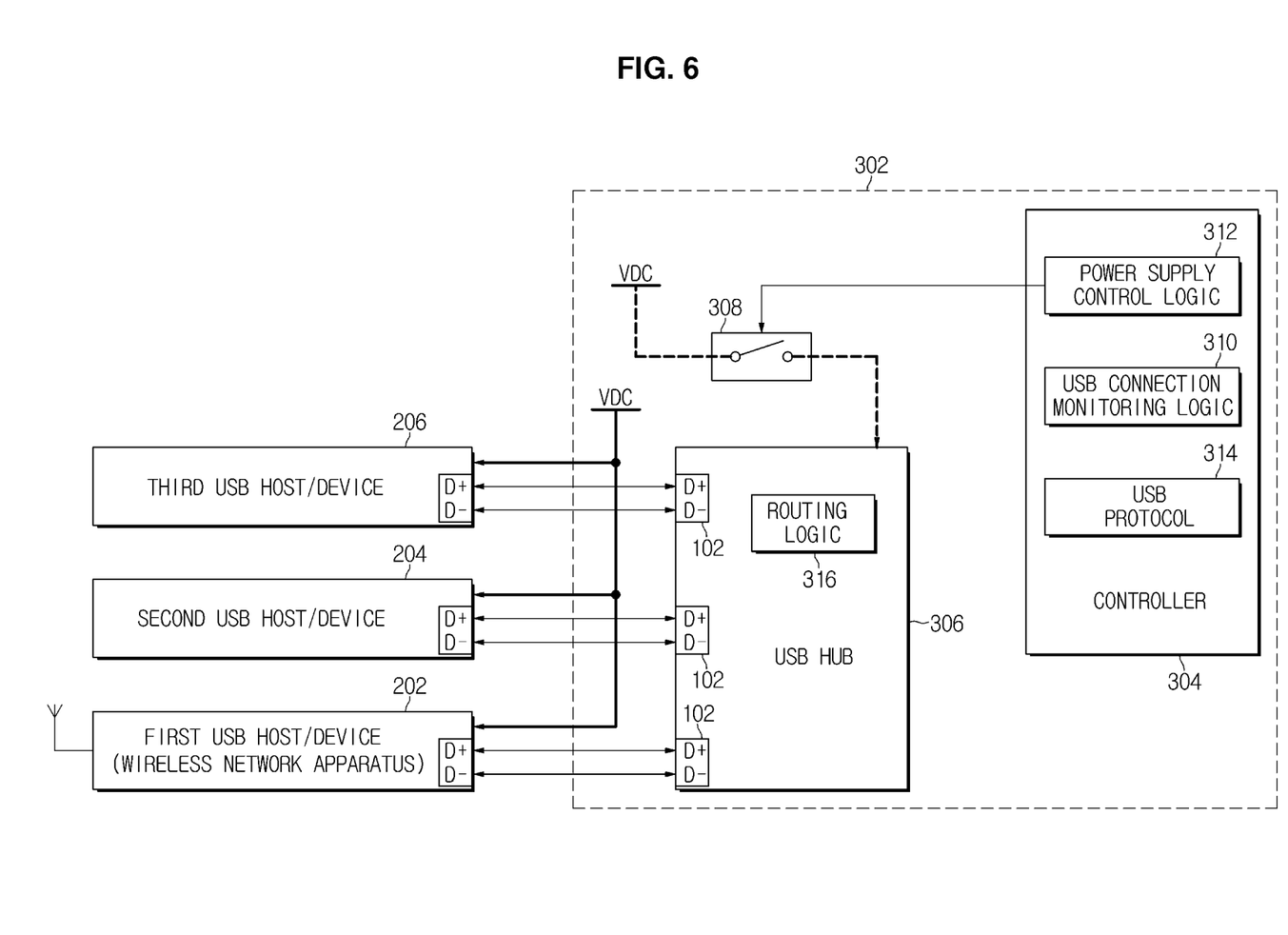
FIG. 6 is an equivalent circuit diagram when the first switch of FIG. 3 is turned off.

FIG. 4 is a view illustrating a USB control method of an image forming apparatus in accordance with an exemplary embodiment. The USB control method of the image forming apparatus in FIG. 4 includes determining necessity of power supply to the USB hub 306, and cutting off supplying power to the USB hub 306 if power supply to the USB hub 306 is not necessary. The description of FIG. 4 will refer to FIGS. 5 and 6. FIG. 5 is an exemplary equivalent circuit diagram when the first switch 308 of FIG. 3 is turned on. FIG. 6 is an exemplary equivalent circuit diagram when the first switch 308 of FIG. 3 is turned off.

If power of the image forming apparatus 100 is turned on, basic initialization may be performed, for example, to perform a print job (operation 402). The initialization may be defined as, for example, preheating a fuser or checking a sensor. In the initialization operation, if power is supplied to the main board 302, power is supplied to the USB hub 306 and the USB hosts/devices 202, 204, and 206 connected to the USB hub 306, and the main board 302 recognizes the USB hub 306 and the USB hosts/devices 202, 204, and 206 connected to the USB hub 306.

An operation mode decided according to whether there is a print instruction, etc. is determined (operation 404). For example, when there is a print instruction, a print mode is executed to perform the print job specified in the print instruction. If there is no print instruction or user operation within a predetermined time, a standby mode is started ("standby mode" of operation 404), and if there is no print instruction or user operation for a longer time, a sleep mode is started ("sleep mode" of operation 404).

In the standby mode, the first switch 308 turns on and power is supplied to the USB hub 306 (operation 412). When the first switch 308 turns on, as illustrated in FIG. 5, power supplied from the power source VDC is transmitted to the USB hub 306. A particular job is not necessarily performed in the standby mode, but power may be supplied to the USB hub 306 in a standby state because a standby state in which a job can be performed may be maintained until there is a job instruction. To reduce unnecessary power consumption in the sleep mode, the first switch 308 may be turned off to save power according to the statuses of the USB hub 306 and the USB devices 202, 204, and 206 connected to the USB hub 306. That is, in the sleep mode, connection to the USB hub 306 from the USB hosts/devices 202, 204, and 206 may be determined through recognition of the USB host/device (operation 406). If the USB hosts/devices 202, 204, and 206 are connected to the USB hub 306 ("yes" of operation 408), it is determined whether the wireless network apparatus 202 is included in the connected USB hosts/devices 202, 204, and 206 (operation 410). The wireless network apparatus 202 is a representative apparatus of the USB hosts/devices to which power should be constantly supplied. If a USB host/device to which power should be constantly supplied such as the wireless network apparatus 202 is connected ("yes" of operation 410), the first switch 308 turns on and power is supplied to the USB hub 306 (operation 412). If the first switch 308 is turned on, as illustrated, for example, in FIG. 5, power supplied from the power source VDC is transmitted to the USB hub 306. While power is supplied to the USB hub 306, the image forming apparatus 100 waits for a next operation (operation 414).

In operations 408 and 410, if none of the USB hosts/devices 202, 204, and 206 is connected ("no" of operation 408), or if some of the USB hosts/devices 202, 204, and 206 are connected but no USB host/device requiring constant power supply such as the wireless network apparatus 202 is included ("no" of operation 410), the first switch 308 turns off and power supply to the USB hub 306 is cut off (operation 416). If the first switch 308 is turned off, as illustrated, for example, in FIG. 6, the power supply path to the USB hub 306 from the power source VDC is disconnected, and power supply to the USB hub 306 is cut off. The power supply path between the power source VDC and the USB hub 306 marked with a bold dashed line in FIG. 6 indicates that the power supply is cut off. In operation 408, if none of the USB hosts/devices 202, 204, and 206 is connected ("no" of operation 408), no power need be supplied to the USB hub 306, and the first switch 308 turns off to cut off power supply to the USB hub 306. In operation 410, if some of the USB hosts/devices 202, 204, and 206 are connected but no USB host/device requiring constant power supply such as the wireless network apparatus 202 is included ("no" of operation 410), no power need be supplied to the USB hub 306, and the first switch 308 turns off to cut off power supply to the USB hub 306. While power supply to the hub 306 is cut off, the image forming apparatus 100 waits for a next operation (operation 414).

Figure 7:
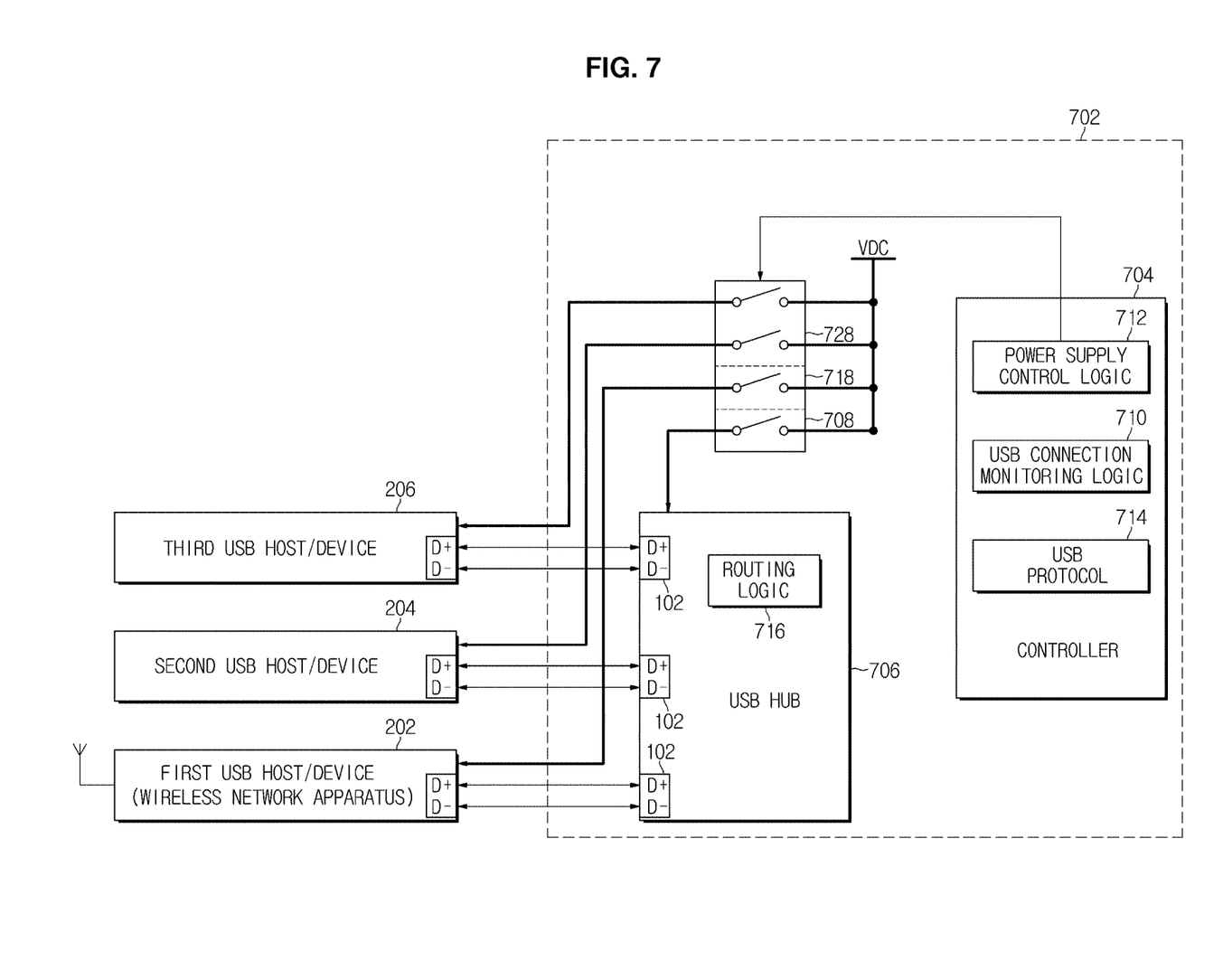
FIG. 7 is a view illustrating a connection relation for USB data communication between an image forming apparatus and USB hosts/devices in accordance with an exemplary embodiment.

FIG. 7 is a view illustrating a connection relation for USB data communication between an image forming apparatus and USB hosts/devices in accordance with an exemplary embodiment. As illustrated in FIG. 7, according to an embodiment, a main board 702 of an image forming apparatus 100 includes a controller 704, a USB hub 706, a first switch 708, and second and third switches 718 and 728.

The controller 704 controls operations, e.g., all operations of the image forming apparatus 100. The controller 704 cuts off unnecessary power supply after recognizing connection/disconnection statuses of the USB hub 706, and the USB hosts/devices 202, 204, and 206 connected to the USB hub 706. The controller 704 includes a USB connection monitoring logic 710, a power supply control logic 712, and a USB protocol 714. The USB connection control logic 710 of the controller 704 monitors connection statuses of the USB hosts/devices 202, 204, and 206 connected to the USB hub 706, and recognizes types of the USB hosts/devices 202, 204, and 206. The power supply control logic 712 of the controller 704 generates a control signal to control on/off of the first switch 708 provided on the power transmission path to the USB hub 708, and on/off the second and third switches 718 and 728 provided on the power transmission paths to the USB hosts/devices 202, 204, and 206. That is, the power supply control logic 712 supplies power to the USB hub 706 based on information of connection statuses and recognition for the USB hosts/devices 202, 204, and 206, or cuts off supplying power to the USB hub 706. The power supply control logic 712 supplies power to the USB hosts/devices 202, 204, and 206 based on information of connection statuses and recognition for the USB hosts/devices 202, 204, and 206, or cuts off power supply to the USB hub 706. The power supply control logic 712 generates a first control signal to control on/off the first switch 708 and second and third control signals to control on/off the second and third switches 718 and 728. The USB protocol of the controller 704 is for storing and managing USB communication specifications.

The USB hub 706 includes a routing logic 716. The routing logic 716 is involved in assigning communication paths of the USB hosts/devices 202, 204, and 206 connected to the USB hub 706. The USB hub 706 includes the USB port 102 mentioned above with reference to FIGS. 1 and 2. Each of the USB hosts/devices 202, 204, and 206 may include the USB port, or be connected to a USB cable.

The first switch 708 may supply or cut off power to the USB hub 706 from the power source VDC, and is turned on/off by the first control signal generated by the power supply control logic 712 of the controller 704. If the first switch 708 is turned on, power is supplied to the USB hub 706, and if the first switch 708 is turned off, power supply to USB hub 706 is cut off. The second and third switches 718 and 728 may supply or cut off power to the USB hosts/devices 202, 204, and 206 from the power source VDC, and are turned on/off by the second and third control signals generated by the power supply control logic 712 of the controller 704. In FIG. 7, the second switch 718 switches power supply to USB hosts/devices requiring constant power supply such as the network apparatus 202. The third switch 728 switches power supply to USB hosts/devices (for example, an external hard disk drive, a USB memory, etc.) which do not need a constant power supply. Functions of the second and third switches 718 and 728 may be switched according to the type of USB host/device connected to the USB hub 706. If the second and third switches 718 and 728 are turned on, power may be supplied to the USB hosts/devices 202, 204, and 206 through the second and third switches 718 and 728, and if the second and third switches 718 and 728 are turned off, power supply to the USB hosts/devices 202, 204, and 206 is cut off. For reference, the plurality of USB hosts/devices 202, 204, and 206 connected to the USB hub 706 of the image forming apparatus 100 may function as USB hosts by themselves.

Figure 8:
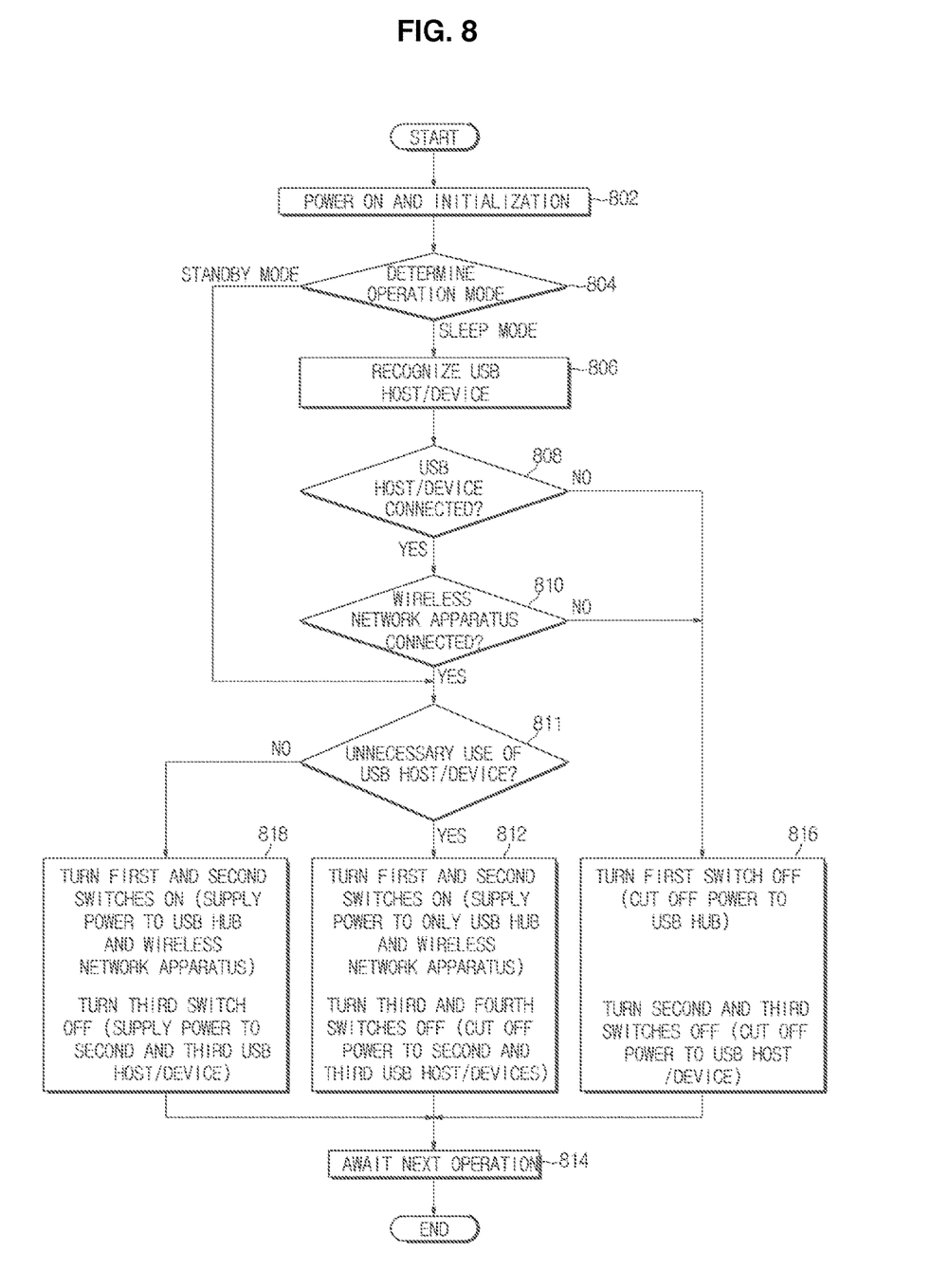
FIG. 8 is a view illustrating a USB control method of an image forming apparatus in accordance with an exemplary embodiment.
Figure 9:
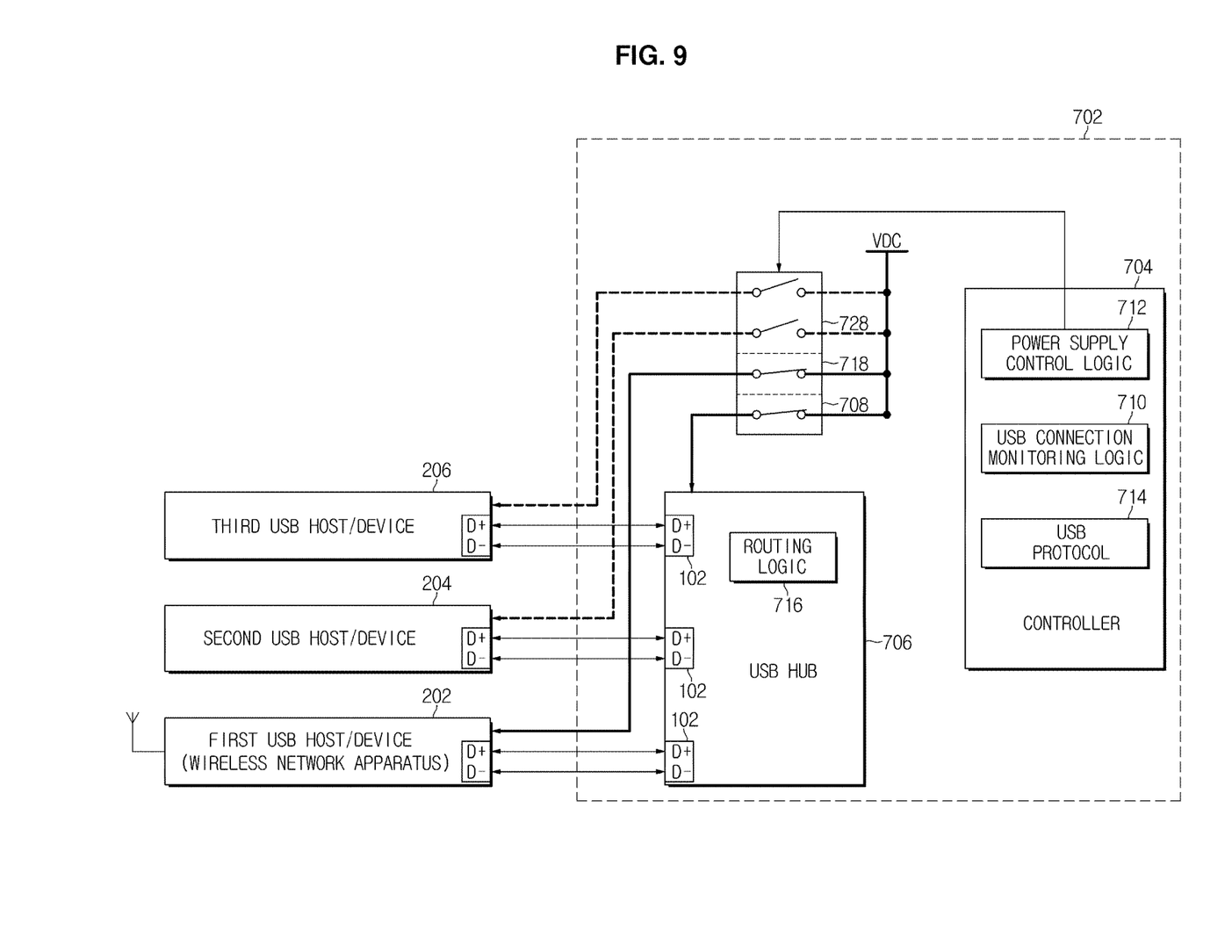
FIG. 9 is an equivalent circuit diagram when first and second switches are turned on and a third switch is turned off in FIG. 7.
Figure 10:
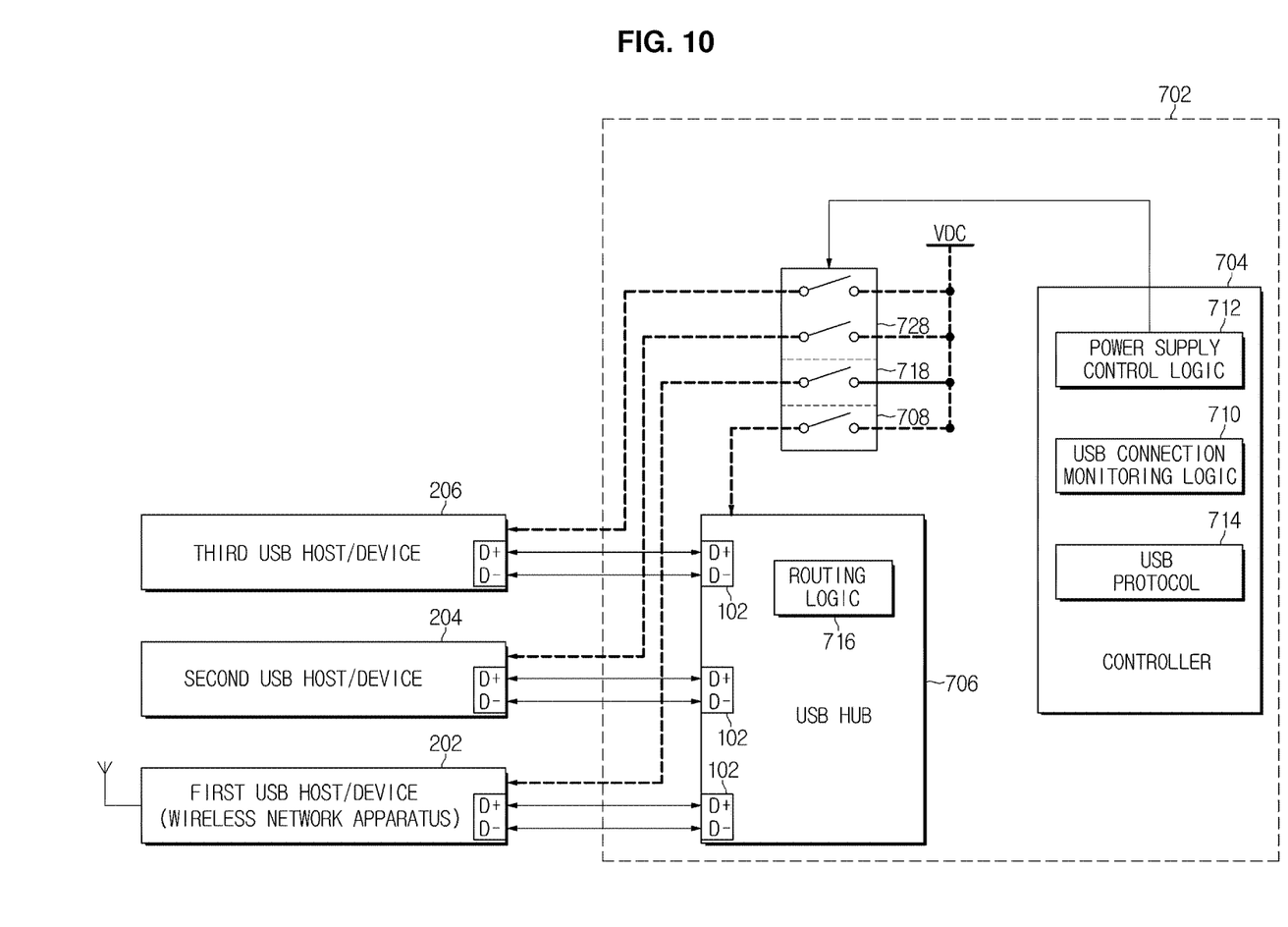
FIG. 10 is an equivalent circuit diagram when all of the first to third switches of FIG. 7 are turned off.

FIG. 8 is a view illustrating a USB control method of an image forming apparatus in accordance with an exemplary embodiment. The USB control method of the image forming apparatus illustrated in FIG. 8 includes determining a necessity of power supply to the USB hub 706, and cutting off power supply if power supply to the USB hub 706 is unnecessary. FIG. 9 is a circuit diagram when the first and second switches 708 and 718 of FIG. 7 are turned on and the third switch 728 is turned off. FIG. 10 is a circuit diagram when all of the first to third switches 708, 718, and 728 of FIG. 7 are turned off.

If power of the image forming apparatus 100 is turned on, basic initialization required to perform print job may be performed (operation 802). Initialization may be defined, for example, as preheating a fuser or checking a sensor.

An operation mode decided according to whether there is a print instruction, etc. is determined (operation 804). For example, if there is a print instruction, a print mode is executed to perform a print job specified in the print instruction. If there is no print instruction or user operation within a predetermined time, a standby mode is started ('standby mode') of operation 804, and if there is no print instruction or user operation for a longer time, a sleep mode is started ('sleep mode' of operation 804).

In the standby mode, if the USB host/device is connected ("yes" of operation 810), it is determined whether there is unnecessary use of the USB hosts/devices 202, 204, and 206 (operation 811). Since unnecessary power consumption should be reduced in the sleep mode, the first switch 708 may be turned off to save power according to the statuses of the USB hub 706 and the USB devices 202, 204, and 206 connected to the USB hub 706. That is, in the sleep mode, connection of the USB hub 706 with the USB hosts/devices 202, 204, and 206 is determined through recognition of the USB host/device. If the USB hosts/devices 202, 204, and 206 are connected to the USB hub 706 ("yes" of operation 808), it may be determined whether the wireless net work apparatus 202 among the connected USB hosts/devices 202, 204, and 206 operation 810 is included. The wireless network apparatus 202 is a representative USB host/device requiring constant power supply. If the USB host/device requiring constant power supply such as the wireless network apparatus 202 is connected ("yes" of operation 810), unnecessary use of the USB hosts/devices 202, 204, and 206 is determined (operation 811). Even when the USB hosts/devices 202, 204, and 206 are connected to the USB hub 705, the USB hosts/devices may not actually be in use, and thus it should be determined whether there is unnecessary use of the USB hosts/devices 202, 204, and 206. If the connected USB hosts/devices 202, 204, and 206 are unnecessary ("yes" of operation 811), the first and second switches turn on to supply power to the USB hub 706 and the wireless network apparatus 202, and the third switch 728 turns off to cut off power supply to the rest of the USB hosts/devices 204 and 206 operation 812. The first and second switches 708 and 718 turn on, as illustrated, for example, in FIG. 9, to supply power from the power source VDC to the USB hub 706 and the wireless network apparatus 202, and the third switch 728 turns off to cut off power supply to the USB hosts/devices 204 and 206. While power is supplied to the USB hub 706, the image forming apparatus 100 waits for a next operation (operation 814).

In operations 808 and 810, if none of the USB hosts/devices 202, 204, and 206 is connected ("no" of operation 808), if some of the USB hosts/devices are connected but no USB host/device requiring constant power supply such as the wireless network apparatus 202 is included ("no" of operation 810), or if the connected USB hosts/devices 202, 204, and 206 are necessary ("no" of operation 811), the first switch 708 turns off to cut off power supply to the USB hub 706, and the second to third switches 718 and 728 turn off to cut off power supply to the USB hosts/devices 202, 204, and 206 (operation 816). If the first switch 708 is turned off, as illustrated, for example, in FIG. 10, the power supply path to the USB hub 706 from the power source VDC is not formed and power supply to the USB hub 706 is cut off. If the second and third switches 718 and 728 are turned off, as illustrated in FIG. 10, the power supply path to the USB hosts/devices 202, 204, and 206 from the power source VDC is not formed and power supply to the USB hosts/devices 202, 204, and 206 is cut off. In FIG. 10, the power supply paths between the power source VDC and the USB hub 706, and between the power source VDC and the USB hosts/devices 202, 204, and 206 marked with bold dashed lines indicate that power supply is cut off. In operation 808, if none of the USB hosts/devices 202, 204, and 206 is connected ("no" of operation 808), power need not be supplied to the USB hub 706, and thus the first switch 708 turns off and power supply to the USB hub 706 is cut off. In addition, in operation 410, even when some of the USB hosts/devices 202, 204, and 206 are connected, but no USB host/device requiring constant power supply such as the wireless network apparatus 202 is included ("no" of operation 810) and use of all of the connected USB hosts/devices 202, 204, and 206 is unnecessary ("no" of operation 811), power need not be supplied to the USB hub 706 or the connected USB hosts/devices 202, 204, and 206, and the first to third switches 708, 718, 728 turn off to cut off power supply to the USB hub 706 and the USB hosts/devices 202, 204, and 206. When power supply to the USB hub 706 is cut off, the image forming apparatus 100 waits for a next operation (operation 814).

Figure 11:
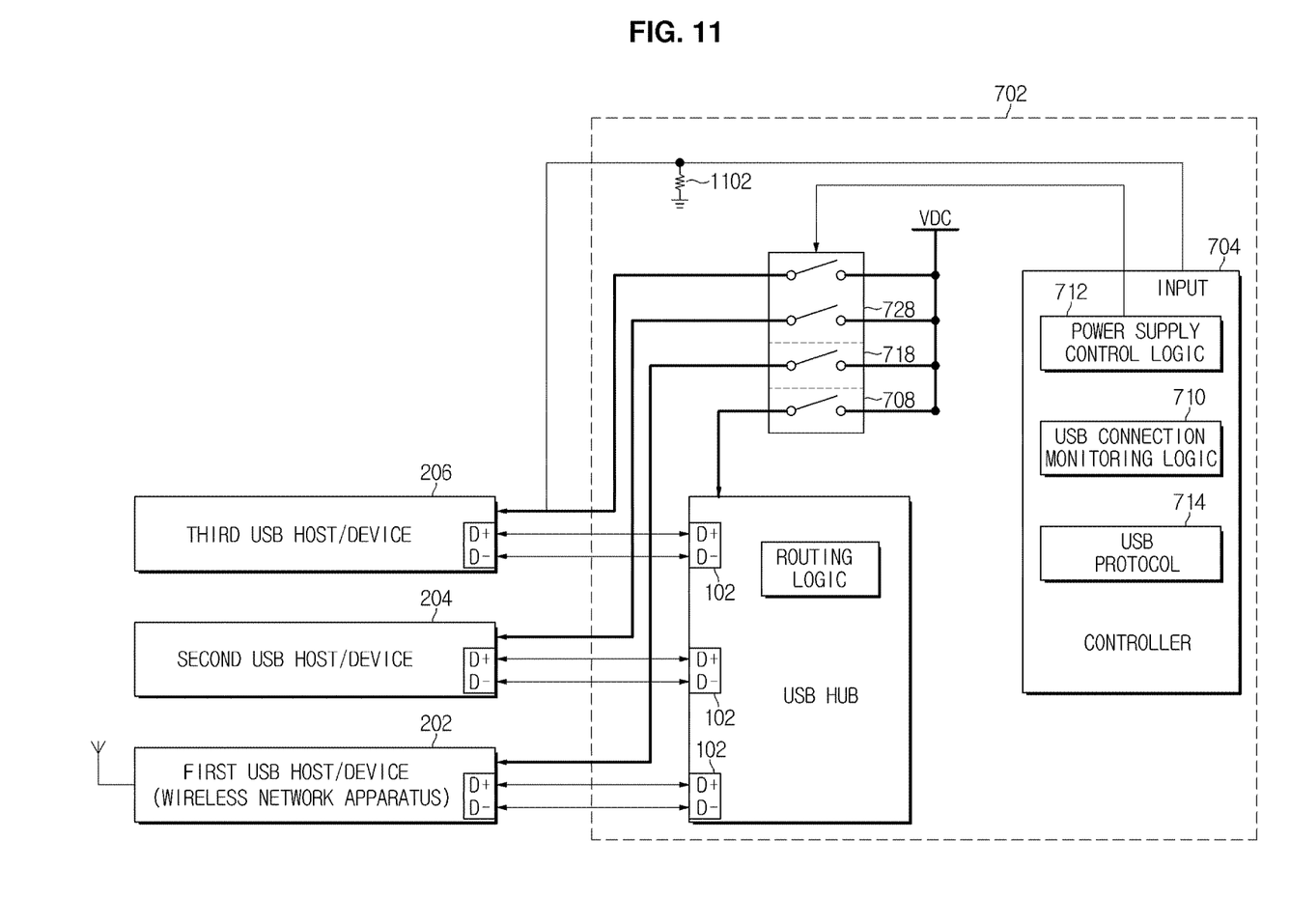
FIG. 11 is a view illustrating a circuit configuration for recognizing connection of a USB host/device in hardware by a controller of an image forming apparatus in accordance with an embodiment.

FIG. 11 is a view illustrating a circuit configuration for recognizing connection of a USB host/device in hardware by a controller of an image forming apparatus in accordance with an embodiment. As illustrated in FIG. 11, one input port of the controller 704 and a USB port are electrically connected, and a pull-down resistor 1102 is connected in parallel therein.

If the USB host/device (for example, 206) is connected to the USB port, a power source of the connected USB host/device 206 and the input port of the controller 704 are connected electrically, and a signal of a logical value "HIGH" made by pull-down resistor 1102 is input to the input port of controller 704. The controller 704 recognizes connection of the USB host/device 206 to the USB port through the input signal of the logical value "HIGH." If the USB host/device 206 is disconnected from the USB port, a signal of a logical value "LOW" made by pull-down resistor 1102 is input to the input port of the controller 704, and the controller 704 recognizes disconnection of the USB host/device 206 from the USB port through the input signal of the logical value "LOW."

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An electronic device comprising:
    a Universal Serial Bus (USB) hub connectable to a USB host/device;
    a first switch configured to switch a supply of power on/off to the USB hub;
    at least one memory storing instructions; and
    a controller including at least one processor that executes the instructions stored in the at least one memory to:
        determine if the USB host/device connected to the USB hub is a first type of USB host/device requiring a constant source of power or a second type of USB host/device not requiring a constant source of power, and
        turn off the first switch to cut off the supply of power to the USB hub for reducing power consumption when the second type of USB host/device not requiring the constant supply of power is determined as connected to the USB hub.

2. The electronic device according to claim 1, wherein the USB host/device connected to the USB hub receives power from the USB hub.

3. The electronic device according to claim 1, wherein the USB hub includes at least one of a USB port and an EDI port.

4. The electronic device according to claim 1, wherein the first type of USB host/device requiring the constant supply of power includes a wireless network apparatus.

5. The electronic device according to claim 1, wherein the USB hub includes a sleep mode recognizable by the controller to control the first switch.

6. An electronic device comprising:
a Universal Serial Bus (USB) hub connectable to a USB host/device;
a first switch configured to switch a supply of power on/off to the USB hub;
a second switch and a third switch configured to switch on/off to directly supply power to the USB host/device without the supplied power going through the USB hub;
at least one memory storing instructions; and
a controller including at least one processor that executes the instructions stored in the at least one memory to:
determine if the USB host/device connected to the USB hub is a first type of USB host/device requiring a constant source of power or a second type of USB host/device not requiring a constant source of power, and
selectively turn off at least one of the first switch, the second switch, and the third switch to cut off the supply of power to the USB hub or to the USB host/device connected to the USB hub for reducing power consumption when the second type of USB host/device not requiring the constant supply of power is determined as being connected to the USB hub.

7. The electronic device according to claim 6, wherein the USB hub includes a sleep mode recognizable by the controller to control at least one of the first switch, the second switch and the third switch.

8. The electronic device according to claim 7, wherein:
the second switch is configured to switch the supply of power on/off to the first type of USB host/device requiring the constant supply of power in the sleep mode for reducing power consumption; and
the third switch is configured to switch the supply of power on/off to the second type USB host/device not requiring the constant supply of power in the sleep mode.

9. The electronic device according to claim 8, wherein the first type of USB host/device requiring the constant supply of power includes a wireless network apparatus.

10. The electronic device according to claim 6, wherein the USB hub includes at least one of a USB port and an EDI port.

11. A control method of an electronic device, which has a Universal Serial Bus (USB) hub connectable to a USB host/device, a first switch configured to switch a supply of power on/off to the connected USB hub, at least one memory storing instructions, and a controller including at least one processor that executes the instructions stored in the at least one memory to turn the first switch on/off, the method comprising:
determining by the at least one processor of the controller whether a mode for reducing power consumption in the connected USB host/device is in progress;
determining by the at least one processor of the controller if the connected USB host/device is a first type of USB host/device requiring a constant source of power or a second type of USB host/device not requiring a constant source of power; and
when the mode for reducing power consumption is determined to be in progress, the at least one processor of the controller executing the instructions stored in the at least one memory turning the first switch off to cut off the supply of power to the USB hub when the second type of USB host/device not requiring the constant supply of power is determined as being connected to the USB hub.

12. The control method according to claim 11, wherein the mode for reducing power consumption determined to be in progress is a sleep mode.

13. The control method according to claim 12, wherein, when the electronic device is not in the sleep mode, the first switch is turned on and the power is supplied to the USB host/device through the USB hub.

14. The control method according to claim 11, wherein the first type USB host/device requiring the constant supply of power includes a wireless network apparatus.

15. A control method of an electronic device, which has a Universal Serial Bus (USB) hub connectable to a first type of USB host/device, a second type of USB host device, a first switch configured to switch a supply of power on/off to the USB hub, a second switch configured to switch the supply of power on/off to the first type of the USB host/device, a third switch configured to switch the supply of power on/off to the second type of USB host/device, at least one memory storing instructions, a controller including at least one processor that executes the instructions stored in the at least one memory to turn each of the first switch, the second switch, and the third switch on/off to control the supply of power to the USB hub, the first type of the USB host/device, and the second type of the USB host/device, the method comprising:
determining by the at least one processor of the controller whether a mode for reducing power consumption in the connected USB host/device is in progress;
determining if the connected USB host/device is the first type of USB host/device requiring a constant source of power or the second type of USB host/device not requiring a constant source of power; and
if the determined mode for reducing power consumption is in progress, when the second type of USB host/device not requiring the constant supply of power is connected, selectively turning off by the at least one processor of the controller executing the instructions stored in the at least one memory at least one of the first switch, the second switch, and the third switch to cut off the supply of power to the USB hub or the USB host/device connected to the USB hub.

16. The control method according to claim 15, wherein the mode for reducing power consumption determined to be in progress is a sleep mode.

17. The control method according to claim 16, wherein:
the second switch is provided to switch the supply of power on/off to the first type of USB host/device requiring the constant supply of power in the sleep mode for reducing power consumption; and
the third switch is provided to switch the supply of power on/off to the second type of USB host/device not requiring the constant supply of power in the sleep mode.

18. The control method according to claim 15, wherein the first type of USB host/device requiring the constant supply of power includes a wireless network apparatus.

19. The control method according to claim 15, wherein the USB hub includes at least one of a USB port and an EDI port.

20. A control method of an electronic device, which has a Universal Serial Bus (USB) hub connectable to a USB host/device, a first switch configured to switch a supply of power on/off to the USB hub, at least one memory storing instructions, a controller including at least one processor configured to execute the instructions stored in the at least one memory to turn the first switch on/off to control the supply of power to the USB hub, a pull-down resistor connected in parallel on a path electrically connecting one input port of the controller and a port of USB hub, the method comprising:

receiving logic signals by the controller including the at least one processor at a high/low level on the path electrically connected by the pull-down resistor depending on a connection state of the USB host/device; and recognizing, by the at least one processor of the controller executing the instructions stored in the at least one memory, a type of the USB host/device and the connection state of the USB host/device through the received logic signals.

21. The control method according to claim 20, wherein, when the USB host/device is recognized as being connected to the USB hub and a sleep mode for reducing power consumption is in progress, if no USB host/device is connected to the USB hub and when only a type of the USB host/device not requiring a constant supply of power is recognized as being connected to the USB hub, the first switch is turned off by the at least one processor of the controller and the supply of power to the USB hub is cut off.

22. An image forming apparatus comprising:
a Universal Serial Bus (USB) hub connectable to a USB host/device;
a first switch configured to switch a supply of power on/off to the USB hub;
at least one memory storing instructions; and
a controller including at least one processor that executes the instructions stored in the at least one memory to:
determine if the USB host/device connected to the USB hub is a first type of USB host/device requiring a constant source of power or a second type of USB host/device not requiring a constant source of power, and
turn off the first switch to cut off the supply of power to the USB hub for reducing power consumption when the second type of USB host/device not requiring the constant supply of power is determined as connected to the USB hub.

23. The image forming apparatus according to claim 22, wherein the power is supplied to the USB host/device connected to the USB hub from the USB hub.

24. The image forming apparatus according to claim 23, wherein the USB hub includes at least one of a USB port and an EDI port.

25. The image forming apparatus according to claim 23, wherein the first type of USB host/device requiring the constant supply of power includes a wireless network apparatus.

26. The image forming apparatus according to claim 23, wherein the mode for reducing power consumption is a sleep mode that is recognizable by the controller.

27. An image forming apparatus comprising:
a Universal Serial Bus (USB) hub connectable to a USB host/device;
a first switch configured to switch a supply of power on/off to the USB hub;
a second switch and a third switch configured to switch on/off to directly supply the power to the USB host/device without going through the USB hub;
at least one memory storing instructions; and
a controller including at least one processor that executes the instructions stored in the at least one memory to:
determine if the USB host/device connected to the USB hub is a first type of USB host/device requiring a constant source of power or a second type of USB host/device not requiring a constant source of power, and
selectively turn off at least one of the first switch, the second switch and the third switch to cut off the supply of power to the USB hub, or the USB host/device connected to the USB hub in a mode to reduce power consumption when the second type of USB host/device not requiring a constant supply of power is determined as connected to the USB hub.

28. The image forming apparatus according to claim 27, wherein the mode to reduce power consumption is a sleep mode that is recognizable by the controller.

29. The image forming apparatus according to claim 28, wherein:
the second switch is provided to switch the supply of power on/off to a first USB host/device requiring the constant supply of power in a sleep mode for reducing power consumption; and
the third switch is provided to switch the supply of power on/off to a second USB host/device not requiring the constant supply of power in the sleep mode.

30. The image forming apparatus according to claim 29, wherein the USB host/device requiring the constant supply of power includes a wireless network apparatus.

31. The image forming apparatus according to claim 27, wherein the USB hub includes at least one of a USB port and an EDI port.

* * * * *